United States Patent
Yogev

(10) Patent No.: US 11,404,935 B2
(45) Date of Patent: Aug. 2, 2022

(54) SYSTEM FOR ENERGY STORAGE AND ELECTRICAL POWER GENERATION

(71) Applicant: Augwind Ltd., Nes Ziyona (IL)

(72) Inventor: Or Yogev, Gedera (IL)

(73) Assignee: AUGWIND LTD., Nes Ziyona (IL)

(*) Notice: Subject to any disclaimer, the term of this patent is extended or adjusted under 35 U.S.C. 154(b) by 208 days.

(21) Appl. No.: 16/919,862

(22) Filed: Jul. 2, 2020

(65) Prior Publication Data

US 2021/0075296 A1    Mar. 11, 2021

(30) Foreign Application Priority Data

Sep. 8, 2019  (IL) ........................................... 269163

(51) Int. Cl.
| | |
|---|---|
| H02K 7/18 | (2006.01) |
| F15B 1/027 | (2006.01) |
| H02J 15/00 | (2006.01) |

(52) U.S. Cl.
CPC ............. H02K 7/183 (2013.01); F15B 1/027 (2013.01); H02J 15/006 (2013.01)

(58) Field of Classification Search
CPC ......... H02K 7/183; F15B 1/027; H02J 15/006
See application file for complete search history.

(56) References Cited

U.S. PATENT DOCUMENTS

| | | |
|---|---|---|
| 4,058,979 A | 11/1977 | Germain |
| 7,281,371 B1 | 10/2007 | Heidenreich |
| 2010/0089063 A1 | 4/2010 | Mcbride et al. |
| 2014/0338318 A1 | 11/2014 | Oppenheimer |
| 2015/0176559 A1 | 6/2015 | Hongawa et al. |
| 2015/0267612 A1 | 9/2015 | Bannari |
| 2021/0104912 A1* | 4/2021 | Matsukuma ............ H02J 15/00 |

FOREIGN PATENT DOCUMENTS

| | | |
|---|---|---|
| CN | 108 571 415 A | 9/2018 |
| DE | 10 2016 002749 A1 | 12/2017 |
| EP | 2 832 666 A1 | 4/2015 |
| EP | 3 091 147 A1 | 9/2016 |
| JP | H0617555 | 1/1994 |
| WO | 2010/101318 A1 | 9/2010 |
| WO | 2011/076926 A2 | 6/2011 |
| WO | 2018092122 A1 | 5/2018 |

* cited by examiner

Primary Examiner — Sean Gugger
(74) Attorney, Agent, or Firm — Browdy and Neimark, P.L.L.C.

(57) ABSTRACT

A system for energy storage and electricity generation is described. The system includes an energy storage subsystem and an electricity generation subsystem coupled to the energy storage subsystem. The energy storage subsystem is configured to store energy in the form of compressed air at a temperature greater than a temperature of ambient air in the atmosphere. The electricity generation subsystem is configured to produce electricity by utilizing the compressed air stored in the energy storage subsystem at the temperature greater than the temperature of ambient air in the atmosphere.

13 Claims, 3 Drawing Sheets

SYSTEM FOR ENERGY STORAGE AND ELECTRICAL POWER GENERATION

FIELD OF THE INVENTION

This invention relates to technologies storing and generating energy, and more particularly to energy storage and retrieval systems.

BACKGROUND OF THE INVENTION

The world's demand for electric energy is continuously increasing. A vast amount of electric energy is currently generated by oil, gas, coal or nuclear plants. However, burning oil, gas and coal results in polluted air, and all of these fuel resources are rapidly diminishing. Nuclear energy requires the disposal of nuclear waste, which remains dangerous for centuries.

Natural energy sources are effectively inexhaustible and are abundantly available throughout the world in various forms such as natural wind, solar, tidal and wave energy. Unfortunately, natural energy sources have an irregular nature, and peak demands for electrical energy in homes and in industry are usually out of phase with the availability of renewable energy resources.

For example, wind energy conversion technology is today regarded as one of the most technically advanced technologies available that can effectively help develop a low carbon economy while ensuring a clean and secure supply of energy. However, wind is inherently variable. Some days are windy, some are not, and, even during a single day, wind varies throughout the day. Consequently, a mismatch frequently occurs between peak demand from the electrical grid and wind energy availability, since there are many time periods with low winds during peak demand, and vice versa, high winds during periods when the demands of the electrical grid may be low, such as in the evening.

Similarly, solar energy is most abundant typically during the middle of the day, while it diminishes during evening hours, when there is peak demand. Likewise, solar cells generate no electricity at night.

Accordingly, it is necessary that the energy obtained from renewable energy resources be somehow stored so as to be releasable during periods of power demand, as required.

A variety of techniques are available to store excess power for later delivery. One approach to energy storage is the use of batteries. Large storage batteries have been developed on a commercial basis and have been used both in residences and in industry. Electrical storage batteries are, however, inferior, due to problems related to durability and maintenance. Moreover, many large-scale batteries use a lead electrode and acid electrolyte, and these components are environmentally hazardous. In addition, batteries suffer from high degradation and thus require mandatory replacement every several years, depending on the frequency of use.

U.S. Pat. No. 4,058,979 describes combined thermal and compressed air storage systems that utilize an exhaustless heater, such as a thermal storage unit, to provide power with enhanced efficiency. Compressed air is heated by the thermal storage unit prior to entering a turbine, which powers an electrical generator. In various embodiments, ambient air temperature, turbine exhaust or other types of waste heat are used to preheat the compressed air prior to the compressed air entering the thermal storage unit, thereby further increasing system efficiency.

GENERAL DESCRIPTION OF THE INVENTION

The concept of the present invention involves storage of pressurized gas for further utilization in order to store energy and later (when required) to generate electric power.

Thus, according to a general aspect of the present invention, there is provided a system for energy storage and an electrical power generation that includes an energy storage subsystem and an electricity generation subsystem coupled to the energy storage subsystem.

The energy storage subsystem is configured to store energy in the form of compressed air. According to an embodiment of the present invention, the compressed air stored in the energy storage subsystem has a temperature greater than the temperature of ambient air in the atmosphere. The electricity generation subsystem is configured to produce electrical power by utilizing the compressed air stored in the energy storage subsystem at the temperature greater than the temperature of ambient air in the atmosphere.

The energy storage subsystem includes a first energy storage branch and a second energy storage branch that is configured similar to the first energy storage branch.

According to some embodiments of the present invention, the first energy storage branch includes a first air compressing vessel that is configured to be filled with air from the atmosphere and with water, and to compress the air to a predetermined pressure. The first energy storage branch further includes a first air storage vessel pneumatically communicating with the first air compressing vessel and configured to store the compressed air. The first energy storage branch also includes a first compressed air manifold pneumatically coupled to the first air compressing vessel and to the first the air storage vessel, and configured to provide pneumatic communication between the first air compressing vessel and the first air storage vessel. The first energy storage branch also includes a first air inlet manifold pneumatically coupled to the compressed air manifold. The first air inlet manifold is configured to provide air from the atmosphere, so as to compress the air in the first air compressing vessel and afterwards to fill the first air storage vessel with the compressed air.

According to an embodiment, the first energy storage branch also includes a first air valve assembly. The first air valve assembly includes a first air storage valve arranged in the first compressed air manifold between the first air storage vessel and a first coupling point of the first air inlet manifold to the first compressed air manifold. The first air storage valve is configured for control of passage of the compressed air from the first air compressing vessel into the first air storage vessel. The first air valve assembly also includes a first compressed air valve arranged in the first compressed air manifold between the first air compressing vessel and the first coupling point. The first compressed air valve is configured for control of passage of the compressed air from the first air compressing vessel into the first air storage vessel. The first air valve assembly also includes a first inlet air valve configured to control supply of air for compression in the first air compressing vessel, and for storage of the compressed air in the first air storage vessel.

According to an embodiment of the present invention, the first energy storage branch also includes a first water inlet manifold hydraulically coupled to the first air compressing vessel. The first water inlet manifold is configured to supply water to the first air compressing vessel.

According to an embodiment of the present invention, the first energy storage branch also includes a first upper inlet water valve and a first lower inlet water valve arranged in the first water inlet manifold. The first upper and lower inlet water valves are configured to control supply of water into the first air compressing vessel.

According to an embodiment of the present invention, the first energy storage branch further includes a first sprinkler manifold coupled to the first water inlet manifold at one end of first sprinkler manifold, and inserted into the first air compressing vessel at another end of first sprinkler manifold, the first sprinkler manifold being configured to enable hydraulic communication of the first air compressing vessel with the water exchange manifold. The first energy storage branch also includes a first sprinkler nozzle at the end that is inserted into the first compressing vessel, and a first sprinkler valve configured for controlling supply of water into the first air compressing vessel through the first sprinkler nozzle.

Likewise, the second energy storage branch includes a second sprinkler manifold coupled to the second water inlet manifold at one end of second sprinkle manifold, and inserted into the second air compressing vessel at another end of the second sprinkler manifold, the second sprinkler manifold being configured to enable hydraulic communication of the second air compressing vessel with the water exchange manifold. The second energy storage branch also includes a second sprinkler nozzle at the end that is inserted into the second compressing vessel, and a second sprinkler valve configured for controlling supply of water into the first air compressing vessel through the second sprinkler nozzle.

According to an embodiment of the present invention, the second energy storage branch includes a second air compressing vessel that is configured to collect water and air from the atmosphere and to compress the air to a predetermined pressure. The 30 second energy storage branch further includes a second air storage vessel pneumatically communicating with the second air compressing vessel and configured to hold compressed air. The second energy storage branch also includes a second compressed air manifold pneumatically coupled to the second air compressing vessel and to the second air storage vessel, and is configured to provide pneumatic communication between the second air compressing vessel and the second air storage vessel. The second energy storage branch also includes a second air inlet manifold pneumatically, coupled to the compressed air manifold. The second air inlet manifold is configured to provide air from the atmosphere to be compressed in the second air compressing vessels and to fill the second air storage vessel with the compressed air.

According to an embodiment, the second energy storage branch also includes a second air valve assembly. The second air valve assembly includes a second air storage valve arranged in the second compressed air manifold between the second air storage vessel and a second coupling point of the second air inlet manifold to the second compressed air manifold. The second air storage valve is configured for control of passage of the compressed air from the second air compressing vessel into the second air storage vessel. The second air valve assembly also includes a second compressed air valve arranged in the second compressed air manifold between the second air compressing vessel and the second coupling point. The second compressed air valve is configured for control of passage of the compressed air from the second air compressing vessel into the second air storage vessel. The second air valve assembly also includes a second inlet air valve configured to control supply of air for compression in the second air compressing vessel and for storage of the compressed air in the second air storage vessel.

According to an embodiment of the present invention, the second energy storage branch also includes a second water inlet manifold hydraulically coupled to the second air compressing vessel. The second water inlet manifold is configured to supply water to the second air compressing vessel.

According to an embodiment of the present invention, the second energy storage branch also includes a second upper inlet water valve and a second lower inlet water valve arranged in the second water inlet manifold. The second upper and lower inlet water valves are configured to control supply of water into the second air compressing vessel.

According to an embodiment of the present invention, the first and second air compressing vessels, and the first and second air storage vessels, are mounted in corresponding boreholes made in the ground. The first and second air storage vessels in the boreholes are surrounded by a compacted and thermally isolated filling material filling a space between walls of the vessels and walls of the borehole.

According to an embodiment of the present invention, the energy storage subsystem further includes a water exchange manifold hydraulically coupled to the first water inlet manifold of the first energy storage branch between the first upper and lower inlet water valves at one end of the first water inlet manifold and to the second water inlet manifold of the second energy storage branch between the second upper and lower inlet water valves at another end of the first water inlet manifold. The energy storage subsystem also includes a reverse water pump arranged in the water exchange manifold.

According to an embodiment of the present invention, the reverse water pump is an electric pump that is coupled to an electrical power grid and powered by electricity. The reverse water pump is configured to pump the water for exchange between the first and second air compressing vessels of the first and second energy storage branches, correspondingly.

According to an embodiment of the present invention, the energy storage subsystem further includes a first water exchange valve arranged in the water exchange manifold between the first air compressing vessels and the reverse water pump, and a second water exchange valve arranged in the water exchange manifold between the second air compressing vessel and the reverse water pump. The first water exchange valve and the second water exchange valve are adapted to control exchange of water between the first and second air compressing vessels.

According to an embodiment of the present invention, the first air storage vessel and the second air storage vessel are pneumatically coupled by a compressed air exchange manifold.

According to an embodiment of the present invention, the energy storage subsystem further includes a first air exchange valve and a second air exchange valve. The first and second exchange valves are adapted to control the exchange of compressed air between the first and second air storage vessels.

According to an embodiment of the present invention, the system for energy storage and electrical power generation includes an air pipeline coupled to the compressed air exchange manifold, and an air control valve coupled to the compressed air exchange manifold and to the air pipeline. The air control valve is configured to regulate the flow of the compressed gas released from the first and second air storage vessels of the energy storage subsystem such that a desired flow rate of egress of the compressed gas is maintained over specified periods of time through the air pipeline.

According to an embodiment of the present invention, the system for energy storage and electricity generation includes a control system coupled to the air control valve arranged in the air pipeline to regulate the flow of the compressed gas through the air pipeline. The control system includes an electronic controller coupled to the air control valve, and a pneumatic flow meter arranged within the air pipeline and operatively coupled to the electronic controller. The pneumatic flow meter is configured to produce air flow sensor signals representative of the air flow within the air pipeline. The electronic controller is responsive to air flow sensor signals and is configured to control operation of the air control valve in order to regulate the flow of the compressed gas released from the first and second air storage vessels of the energy storage subsystem.

According to an embodiment of the present invention, the electricity generation subsystem includes an airlift pumping system pneumatically coupled to the air control valve arranged in the air pipeline, and a hydro-electric power system driven by the airlift pumping system.

According to an embodiment of the present invention, the airlift pumping system includes a water collecting tank containing collecting water, and a riser tube having a base immersed in the collecting water. The airlift pumping system is configured for injecting the compressed air into the riser tube through the air pipeline to provide air bubbles within the riser tube. The air bubbles produce an upward flow of the collecting water together with the air bubbles to drive the hydro-electric power system.

According to an embodiment of the present invention, the air pipeline includes an air injector coupled to the base of the riser tube through a plurality of jacket holes. The jacket holes are uniformly distributed around the perimeter of the riser pipe in a plurality of rows and/or columns to ensure uniform feed of the air into the riser tube.

According to an embodiment of the present invention, the airlift pumping system includes a returning tube hydraulically coupled to the hydro-electric power system. The returning tube is configured for returning a flow containing returning water into the water collecting tank after passing through the hydro-electric power system.

According to an embodiment of the present invention, the water collecting tank includes a circulation opening coupled to the returning tube for receiving the flow of the returning water after passing through the hydro-electric power system.

According to an embodiment of the present invention, the hydro-electric power system includes an air release outlet. The air release outlet is configured for releasing air bubbles from the high speed water-air flow mixture after it was used to rotate a turbine of the hydro-electric power system.

The energy storage and electricity generation system of the present invention has many of the advantages of the prior art techniques, while simultaneously overcoming some of the disadvantages normally associated therewith.

The system for energy storage and electricity generation of the present invention enables mitigating problems associated with the unreliable intermittent supply of natural energy by providing a regulated supply of pressurized gas for generating electric energy.

An additional advantage of the energy storage and electricity generation system herein disclosed is that it may be continually upgraded to be sized as needed, which is effective for both long term and short term energy storage.

The system for energy storage and electrical power generation of the present invention only requires minimal moving parts. Unlike other energy storage and/or electrical power generation technologies such as batteries, the system has a long service lifetime and its performance does not degrade with the number of energy storage cycles. Furthermore, the utilized materials are mainly limited to steel/concrete.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
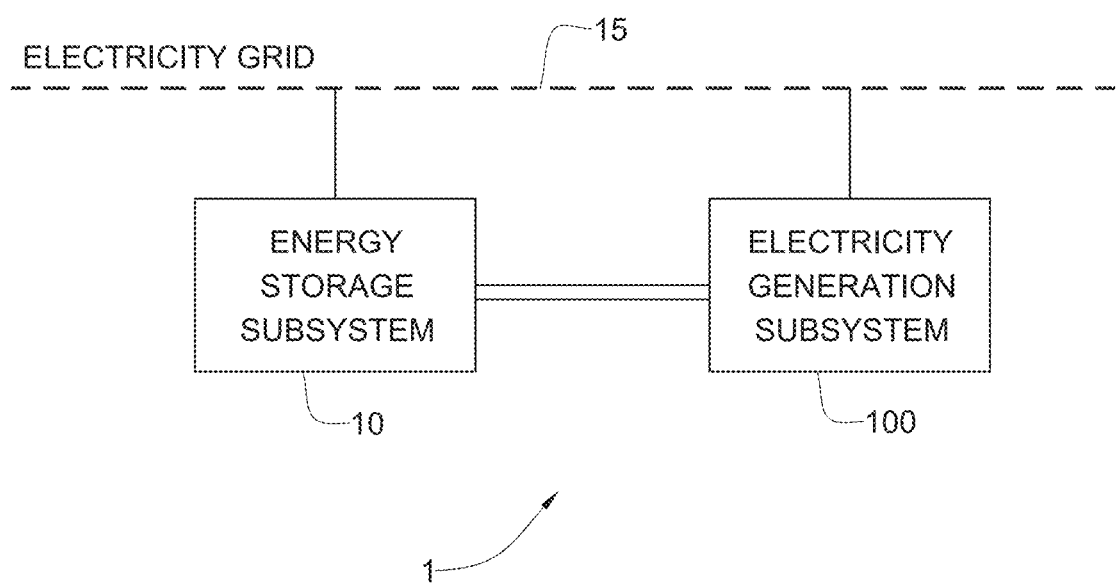
FIG. 1 is a general schematic view of a system for energy storage and electricity generation, according to one embodiment of the present invention.

The principles and operation of the system for energy storage and electrical power generation according to the present invention may be better understood with reference to the drawings and the accompanying description. It should be understood that these drawings are given for illustrative purposes only and are not meant to be limiting. It should be noted that the figures illustrating various examples of the system of the present invention are not to scale, and are not in proportion, for purposes of clarity. It should be noted that the blocks, as well other elements in these figures, are intended as functional entities only, such that the functional relationships between the entities are shown, rather than any physical connections and/or physical relationships. The same reference numerals and alphabetic characters are utilized for identifying those components which are common in the system for energy storage and electricity generation and its components shown in the drawings throughout the present description of the invention. Examples of constructions are provided for selected elements. Those versed in the art should appreciate that many of the examples provided have suitable alternatives which may be utilized.

Referring to FIG. 1, a general schematic view of a system 1 for energy storage and electrical power generation is illustrated, according to one embodiment of the present invention. The system 1 for energy storage and electrical power generation includes an energy storage subsystem 10 configured to store energy in the form of compressed air and an electricity generation subsystem 100 coupled to the energy storage subsystem 10 and configured to produce electricity by utilizing the compressed air stored in the energy storage subsystem 10. The energy storage subsystem 10 and the electricity generation subsystem 100 are coupled to an electricity grid 15. According to an embodiment, the compressed air stored in the energy storage subsystem 10 has a temperature greater than the temperature of the ambient air in the atmosphere.

Figure 2:
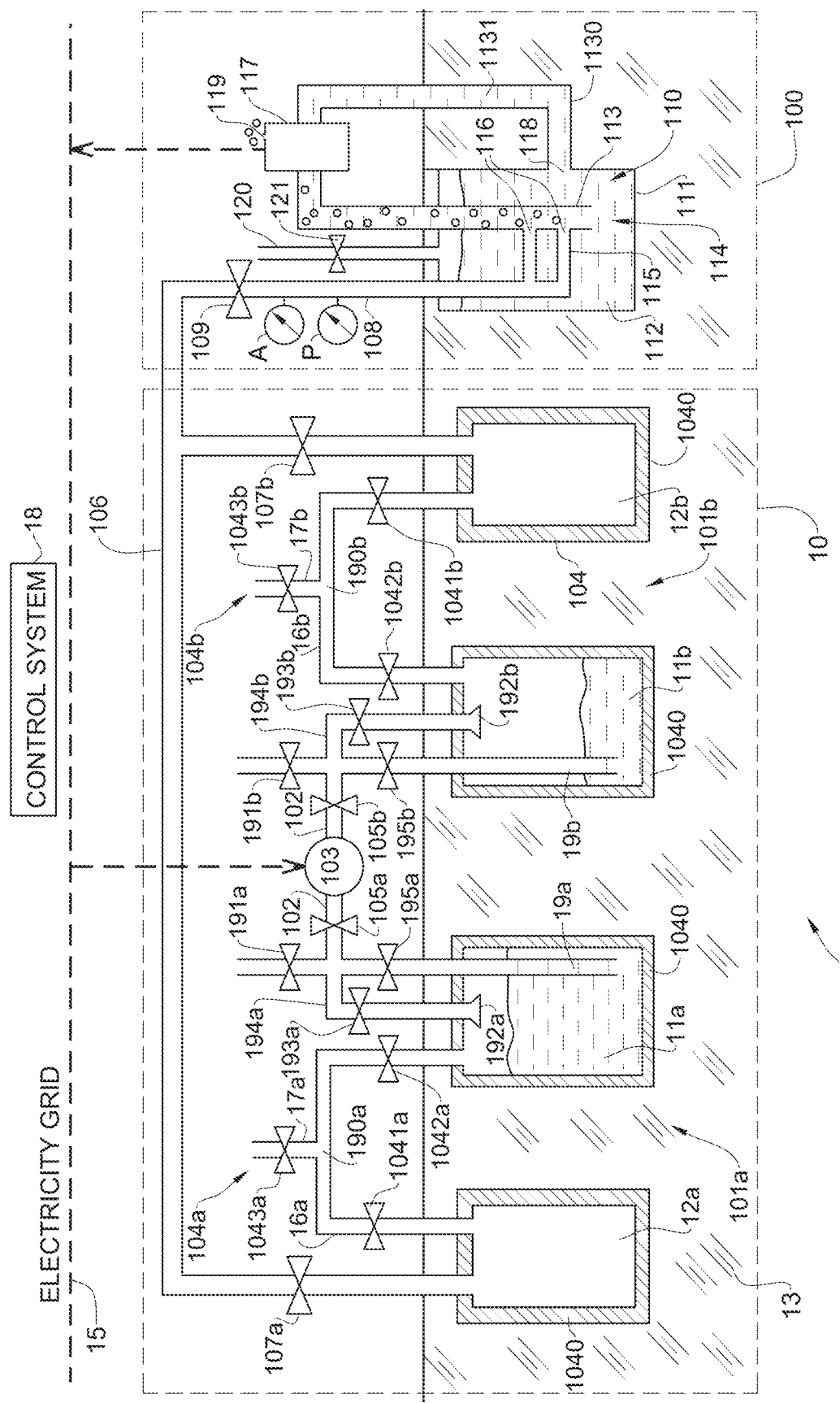
FIG. 2 is a schematic cross-sectional view of the system for energy storage and electrical power generation of FIG. 1, according to an embodiment of the present invention.

Referring to FIG. 2, a schematic cross-sectional view of the system 1 for energy storage and electricity generation of FIG. 1 is illustrated, according to one embodiment of the present invention.

According to an embodiment of the present invention, the energy storage subsystem 10 of the system 1 for energy storage and electrical power generation includes two identical energy storage branches, such as a first energy storage branch 101a and a second energy storage branch 101b.

The first energy storage branch 101a includes a first air compressing vessel 11a configured to collect water and air from the atmosphere and to compress the air to a predetermined pressure. The first energy storage branch 101a also includes a first air storage vessel 12a pneumatically communicating with the first air compressing vessel 11a and configured to hold compressed air.

Likewise, the second energy storage branch 101b includes a second air compressing vessel 11b configured to collect water and air from the atmosphere and to compress the air to a predetermined pressure. The second energy storage branch 101b also includes a second air storage vessel 12b pneumatically communicating with the second air compressing vessel 11b and configured to hold compressed air.

It should be understood that, when desired, a plurality of the first and second air storage vessels 12a and 12b can be used to achieve the increase in compressed air volume. This additional volume can also absorb the pressure transients resulting from changes in the state-of-charge of the first and second air compressing vessels 11a and 11b.

Various types of air compressing vessels and air storage vessels can be used for the purpose of storing compressed gas. The first and second air compressing vessels 11a, 11b, and the air storage vessels 12a, 12b can, for example, be constructed on the ground surface and/or under the ground. However, the vessels, which are built on the ground, may be not economically viable when high volumes are required. Moreover, when the vessels are built on the ground, they require a high level of maintenance and must accommodate many safety regulations.

According to an embodiment of the present invention, the first and second air compressing vessels 11a, 11b and the first and second air storage vessels 12a, 12b are mounted in corresponding boreholes made in the ground 13. Building the air compressing vessels 11a, 11b and the air storage vessels 12a, 12b underground can facilitate effective use of the ground surface in the regions where the underground construction is placed, and preserve the site's appearance.

According to an embodiment, the first and second air storage vessels 12a, 12b and the first and second compressing vessels 11a, 11b in the boreholes are surrounded by a compacted and thermally isolated filling material 1040 filling the space between walls of the vessels and walls of the borehole. It should be understood that when the first and second air storage vessels 12a and 12b and the first and second compressing vessels 11a, 11b are thermally isolated, they can keep the heat accumulated during compression of the air in the first and second air compressing vessels 11a and 11b for a relatively long time.

The entire depth of the boreholes is mainly determined by the soil properties and by the maximal value of the desired magnitude of the pressure of the compressed air that is compressed in the first and second compressing vessels 11a, 11b and then is stored in the first and second air storage vessels 12a and 12b. In particular, the depth of the borehole is such that the vessels are located relatively deep inside the ground in order to be anchored, due to resistance of the filling material surrounding the vessels.

The air pressure within the first and second air storage vessels 12a and 12b communicating with the first and second air compressing vessels 11a and 11b should be sufficient to drive the electricity generation subsystem 100. For example, the air pressure within the first and second air storage vessels 12a and 12b can be in the range of about 10 bar to 500 bar.

It should be understood that generally, the first and second air storage vessels 12a, 12b and the first and second air compressing vessels 11a, 11b can have any, desired shape and be constructed of a suitable metal, plastic or composite material appropriate to withstand the strain on the walls caused by the air-hydraulic pressure inside the vessels.

For example, the vessels suitable for the first and second air compressing vessels 11a, 11b and tier first and second the air storage vessels 12a, 12b are described in International Pat. Appl. Publ. WO2018/092122A1.

According to an embodiment of the present invention, the first energy storage branch 101a of the energy storage subsystem 10 includes a first compressed air manifold 16a pneumatically coupled to the first air compressing vessel 11a and to the first the air storage vessel 12a. Likewise, the second energy storage branch 101b includes a second compressed air manifold 16b pneumatically coupled to the second air compressing vessel 11b and to the second air storage vessel 11b. The first and second compressed air manifolds 16a and 16b are configured to provide pneumatic communication between the first and second air compressing vessels 11a, 11b and the first and second air storage vessels 12a, 12b, correspondingly.

According to an embodiment of the present invention, the first energy storage branch 101a includes a first air inlet manifold 17a pneumatically coupled to the compressed air manifold 16a, while the second energy storage branch 101b includes a second air inlet manifold 17b pneumatically coupled to the second compressed air manifold 16b. The first and second air inlet manifolds 17a and 17b are adapted to provide air from the atmosphere, so as to compress the air in the first and second air compressing vessels 11a, 11b and to fill the first and second air storage vessels 12a, 12b with the compressed air, correspondingly.

According to an embodiment of the present invention, the first energy storage branch 101a includes a first air valve assembly 104a, while the second energy storage branch 101b includes a second air valve assembly 104b.

According to an embodiment of the present invention, the first air valve assembly 104a includes a first air storage valve 1041a arranged in the first compressed air manifold 16a between the first air storage vessel 12a and a first coupling point 190a of the first air inlet manifold 17a to the first compressed air manifold 16a. The first air valve assembly 104a also includes a first compressed air valve 1042a arranged in the first compressed air manifold 16a between the first air compressing vessel 11a and the first coupling point 190a. The first air storage valve 1041a and the first compressed air valve 1042a are provided for control of passage of the compressed air from the first air compressing vessel 11a to the first air storage vessel 12a.

The first air valve assembly 104a further includes a first inlet air valve 1043a configured for controlling the supply of air. The air is supplied for compression in the first air compressing vessel 11a and for storage of the compressed air in the first air storage vessel 12a.

Likewise, the second air valve assembly 104b includes a second air storage valve 1041b arranged in the second compressed air manifold 16b between the second air storage vessel 12b and a second coupling point 190b of the second air inlet manifold 17*b* to the second compressed air manifold 16*b*. The second air valve assembly 104*b* also includes a second compressed air valve 1042*b* arranged in the second compressed air manifold 16*b* between the second air compressing vessel 11*b* and the second coupling point 19*b*. The second air storage valve 1041*b* and the second compressed air valve 1042*b* are provided for control of passage of the compressed air from the second air compressing vessel 11*b* to the second air storage vessel 12*b*.

The second air valve assembly 104*b* further includes a second inlet air valve 1043*b* configured for controlling supply of air. The air is supplied for compression in the second air compressing vessel 11*b* and for storage of the compressed air in the second air storage vessel 12*b*.

According to an embodiment of the present invention, the first energy storage branch 101*a* of the energy storage subsystem 10 also includes a first water inlet manifold 19*a* hydraulically coupled to the first air compressing vessel 11*a*. The first water inlet manifold 19*a* is configured to supply water to the first air compressing vessel 11*a*. Likewise, the energy storage subsystem 10 can include a second water inlet manifold 19*b* that can be arranged in the second energy storage branch bib. The second water inlet manifold 19*b* can be hydraulically coupled to the second air compressing vessel 11*b* and configured to provide water to the second air compressing vessel 11*b*.

According to an embodiment of the present invention, the first energy storage branch 101*a* also includes a first upper inlet water valve 191*a* and a first lower inlet water valve 195*a*, which are both arranged in the first water inlet manifold 19*a* and configured for controlling supply of water into the first air compressing vessel 11*a*. Likewise, the second energy storage branch 101*b* includes a second upper inlet water valve 191*b* and a second lower inlet water valve 195*b*, which are both arranged in the second water inlet manifold 19*b* and configured for controlling supply of water into the first air compressing vessel 11*b*.

The first air compressing vessel 11*a* or the second air compressing vessel 11*b* can be pre-filled charged with water using one or more water compressors (not shown) that can be either a part of the subsystem 10 or be separate units.

When required, the subsystem 10 can also include one or several safety valves (not shown) that can automatically open when pressure in the first and/or second air compressing vessels 11*a*, 11*b* reaches a dangerous level.

According to an embodiment of the present invention, the system 1 for energy storage and electrical power generation includes a water exchange manifold 102 hydraulically coupled to the first water inlet manifold 19*a* between the first upper and lower inlet water valves at one end of the water exchange manifold 102, and to the second water inlet manifold 19*b* between the second upper and lower inlet water valves at another end of the water exchange manifold 102.

According to an embodiment of the present invention, the first energy storage branch 101*a* can also include a first sprinkler manifold 194*a* coupled to the first water inlet manifold 19*a* at one end of first sprinkler manifold 194*a*, and inserted into the first air compressing vessel 11*a* at another end of first sprinkler manifold 194*a*. The first sprinkler manifold 194*a* is configured to enable hydraulic communication of the first air compressing vessel 11*a* with the water exchange manifold 102. The first sprinkler manifold 194*a* is equipped with a first sprinkler nozzle 192*a* at the end that is inserted into the first compressing vessel 11*a*. The first sprinkler manifold 194*a* is also equipped with a first sprinkler valve 193*a* configured for controlling supply of water into the first air compressing vessel 11*a* through the first sprinkler nozzle 192*a*.

Likewise, the second energy storage branch 101*b* can also include a second sprinkler manifold 194*b* coupled to the second water inlet manifold 19*b* at one end of the second sprinkler manifold 194*b*, and inserted into the second air compressing vessel 11*b* at another end. The second sprinkler manifold 194*b* is configured to enable hydraulic communication of the second air compressing vessel 11*b* with the water exchange manifold 102. The second sprinkler manifold 194*b* is equipped with a second sprinkler nozzle 192*b* the end of which is inserted into the second air compressing vessel 11*b*. The second sprinkler manifold 194*b* is also equipped with a second sprinkler valve 193*b* configured for controlling supply of water into the second air compressing vessel 11*b* through the second sprinkler nozzle 192*b*.

According to an embodiment of the present invention, the energy storage subsystem 10 further includes a reverse water pump 103 arranged in the water exchange manifold 102. According to one embodiment, the reverse water pump 103 is an electric pump that is coupled to an electrical power grid 15 and powered by electricity. The reverse water pump 103 is configured to pump the water for exchange between the first and second air compressing vessels 11*a* and 11*b* of the first and second energy storage branches 101*a* and 101*b*, correspondingly.

In order to control the exchange of water between the first and second air compressing vessels 11*a* and 11*b*, the energy storage subsystem 10 includes a first water exchange valve 105*a* and a second water exchange valve 105*b*. The first water exchange valve 105*a* is arranged in the water exchange manifold 102 between the first coupling point 190*a* and the reverse water pump 103, while the second water exchange valve 105*b* is arranged in the water exchange manifold 102 between the second coupling point 190*b* and the reverse water pump 103.

According to an embodiment of the present invention, the first air storage vessel 12*a* and the second air storage vessel 12*b* can be pneumatically coupled by a compressed air exchange manifold 106. In order to control the exchange of compressed air between the first and second air storage vessels 12*a* and 12*b*, the energy storage subsystem 10 includes a first air exchange valve 107*a* and a second air exchange valve 107*b*.

Operation of the energy storage subsystem 10 begins from pre-charging either the first air compressing vessel 11*a* or the second air compressing vessel 11*b* with water.

In order to pre-charge the first air compressing vessel 11*a*, the first upper inlet water valve 191*a* and the first lower inlet water valve 195*a* arranged in the first water inlet manifold 19*a* of the first energy storage branch 101*a* must be opened to enable access of water to the first air compressing vessel 11*a*. In turn, the first compressed air valve 1042*a* and the first inlet air valve 1043*a* are also open to enable escape of the air from the first air compressing vessel 11*a* during the pre-filling with water. The first air storage valves 1041*a*, the first water exchange valve 105*a* and the first air exchange valve 107*a* must be closed to avoid escape of the water from the first air compressing vessel 11*a*. When desired, water can be additionally supplied through the first sprinkler manifold 194*a*. In this case, the first sprinkler valve 193*a* should also be opened.

It should be understood that operation of the energy storage subsystem 10 can begin from pre-charging the second air compressing vessel 11*b* with water, mutatis mutandis.

Upon filling up the first air compressing vessel 11a with water, the first upper inlet water valve 191a and the first sprinkler valve 193a are closed, while the first lower inlet water valve 195a arranged in the first water inlet manifold 19a is opened to provide inlet of water from the first air compressing vessel 11a. Moreover, the second upper inlet water valve 191b and the second lower inlet water valve 195b arranged in the second water inlet manifold 19b, are closed, while the first inlet air valve 1043a and the first compressed air valve 1042a are opened to provide inlet of air into the first air compressing vessel 11a. In turn, the second sprinkler valve 193b is opened to provide inlet of water into the first water inlet manifold 19a. The second compressed air valve 1042b arranged in the second compressed air manifold 16b of the second energy storage branch 101b, is also closed.

Then, the first sprinkler valve 193a, the second air storage valve 1041b and the second compressed air valve 1042b are closed, while the first water exchange valve 105a and the second water exchange valve 105b arranged in the water exchange manifold 102 are opened. Then, the reverse water pump 103 is activated to pump the water from the first air compressing vessel 11a of the first energy storage branch 101a into the second air compressing vessel 11b of the second energy storage branch 101b. During pumping, the water passes through the second sprinkler manifold 194b, and is sprayed through the second sprinkler nozzle 192b. Accordingly, the water is accumulated in the second air compressing vessel 11b, while the air located in the second air compressing vessel 11b is compressed.

It should be noted that owing to compression, the temperature of the air in the second air compressing vessel 11b may increase above the temperature of the original air temperature in the second air compressing vessel 11b. The internal heat generated due to the compressing process of the air is also transferred to the water due to exchange of heat with the sprayed water. Indeed, the heat can be exchanged between the water and the air due to continuous contact between the air and water droplets sprayed from the second sprinkler nozzle 192b.

When the air pressure in the second air compressing vessel 11b reaches a predetermined value, e.g., 10 bar to 60 bar, the second air storage valve 1041b and the second compressed air valve 1042b arranged in the second compressed air manifold 16b are opened to enable passage of the compressed air from the second air compressing vessel 11b into the second air storage vessels 12b, due to air pressure difference between the second air compressing vessel 11b and the second air storage vessels 12b. The second inlet air valve 1043b is closed to avoid escape of the air from the second compressed air manifold 16b during the air passage.

When the second air compressing vessel 11b is filled with water as desired, and all the compressed air is transferred from the second air compressing vessel 11b to the second air storage vessels 12b, the reverse water pump 103 is deactivated, and the second water exchange valve 105b is closed. Then, the second air storage valve 1041b is closed, while the second compressed air valve 1042b and the second inlet air valve 1043b are open to enable inlet flow of air from the atmosphere into the air compressing vessel 11b.

Further, the first lower inlet water valve 195a arranged in the first water inlet manifold 19a is closed, while the first and second water exchange valves 105a and 105b arranged in the water exchange manifold 102 are open, and the reverse water pump 103 is activated in the opposite direction to pump the water from the second air compressing vessel 11b of the second energy storage branch 101b into the first air compressing vessel 11a of the first energy storage branch 101a. During pumping, the water passes through the first sprinkler manifold 194a, and is sprayed through the first sprinkler nozzle 192a. Accordingly, the water is accumulated in the first air compressing vessel 11a, while the air located in the first air compressing vessel 11a is compressed. When the air pressure in the first air compressing vessel 11a reaches a predetermined value, e.g., 10 bar to 60 bar, the first air storage valve 1041a and the first compressed air valve 1042a arranged in the first compressed air manifold 16a are opened to enable passage of the compressed air from the first air compressing vessel 11a into the first air storage vessels 12a due to the pressure difference between the first air compressing vessel 11a and the first air storage vessels 12a. The first inlet air valve 1043a is closed to avoid escape of the air from the first compressed air manifold 16a during the air passage.

When the second air compressing vessel 11b is filled with water as desired, and all the compressed air is transferred from the first air compressing vessel 11a to the first air storage vessels 12a, the reverse water pump 103 is deactivated, and the first water exchange valve 105a is closed.

Then, the first air storage valve 1041a is closed.

As described above, owing to compression, the temperature of the air in the first air compressing vessel 11a may increase above the temperature of the original air temperature in the first air compressing vessel 11a. The internal heat generated due to the compressing process of the air is also transferred to the water due to exchange of heat with the sprayed water. Indeed, heat can be exchanged between the water and the air due to continuous contact between the air and water droplets sprayed from the second sprinkler nozzle 192b.

Such a compression process can be repeated as many times as required for reaching the desired pressure of the air in the first and second air storage vessels 12a and 12b.

It should be understood that at the end of the compression process, a temperature of the water in the first and second air compressing vessels 11a and 11b as well a temperature of the air in the first and second air storage vessels 12a and 12b are greater than the temperature of the external air in the atmosphere. Thus, when the first and second air storage vessels 12a and 12b and the first and second air compressing vessels 11a and 11b are thermally isolated from the environment, the increased temperatures of the compressed air and water can be maintained for a relatively long time.

According to an embodiment of the present invention, the system 1 for energy storage and electrical power generation uses the compressed gas of the first and/or second air storage vessels 12a and 12b of the energy storage subsystem 10 for producing electricity by the electricity generation subsystem 100.

According to an embodiment, the system 1 for energy storage and electricity generation includes an air pipeline 108 and an air control valve 109. The hydraulic control valve 109 is coupled to the air pipeline 108 and to the compressed air exchange manifold 106, and is configured to regulate the flow of the compressed gas released from the first and second air storage vessels 12a and 12b that passes through the compressed air exchange manifold 106 into the air pipeline 108. The regulation is such that a desired flow rate of egress of the compressed gas is maintained over specified periods of time through the air pipeline 108.

In operation, the compressed gas transferred through the air pipeline 108 can be supplied to the electricity generation subsystem 100.

According to an embodiment of the present invention, the electricity generation subsystem 100 includes an airlift pumping system 110 and a hydro-electric power system 117 driven by the airlift pumping system 110.

According to an embodiment of the present invention, the airlift pumping system 110 includes a water collecting tank 111 arranged under the ground. The water collecting tank 111 contains collecting water 112 to be pumped. It should be understood that the collecting water 112 can be pumped into the water collecting tank 111 through a water collecting manifold 120 from any water source. Supply of the collecting water 112 can be controlled by a water collecting valve 121 arranged in the water collecting manifold 120.

When desired, the water accumulated in the air compressing vessels 11a and 11b can also be used as the collecting water 112. In this case, it can be pumped into the water collecting tank 111 through water collecting manifold 120, mutatis mutandis, after the end of the air compression process.

According to an embodiment of the present invention, the airlift pumping system 110 also includes a riser tube 113 which is partially immersed in the water 112. Compressed air is injected at a base 114 of the riser tube 113 through the air pipeline 108 equipped with an air injector 115 to provide air bubbles within the riser tube 113 that produce an upward flow of the water, together with the air bubbles.

According to an embodiment, the air injector 115 is coupled to the base 114 of the riser tube 113 through a plurality of jacket holes 116 uniformly distributed around the pipe perimeter in a plurality of rows and/or columns to ensure uniform feed of the air into the riser tube 113. In operation, the compressed air supplied by the air pipeline 108 enters the riser tube 113 through the jacket holes 116, forming bubbles which move the water within the riser tube 113 in the upward direction.

According to an embodiment, the hydro-electric power system 117 includes an air release outlet 119 through which air released from the bubbles escapes into the atmosphere.

According to an embodiment, the airlift pumping system includes a returning tube 1130 hydraulically coupled to the hydro-electric power system 117. The returning tube 1130 is configured for returning a flow containing the returning water 1131 after passing through the hydro-electric power system 117. The flow of retuning water 1131 without air bubbles returns to the water collecting tank 111 after passing through the hydro-electric power system 117. The returning water flow returns to the water collecting tank 111 through a circulation opening 118 arranged at a wall of the water collecting tank 111.

As described above, the reverse water pump 103 of the energy storage subsystem 10 is an electric pump that is coupled to the electrical power grid 15 and powered by electricity. In operation, the reverse water pump 103 pumps the water for exchange between the first and second air compressing vessels 11a and 11b of the first and second energy storage branches 101a and 101b, correspondingly, so as to compress air and store the compressed air in the first and second air storage vessels 12a and 12b.

The compressed air exiting the air storage subsystem 10 can be controllably, supplied at a desired pressure through the pipeline 108 to drive the hydro-electric power system 117 arranged within the riser tube 113.

Figure 3:
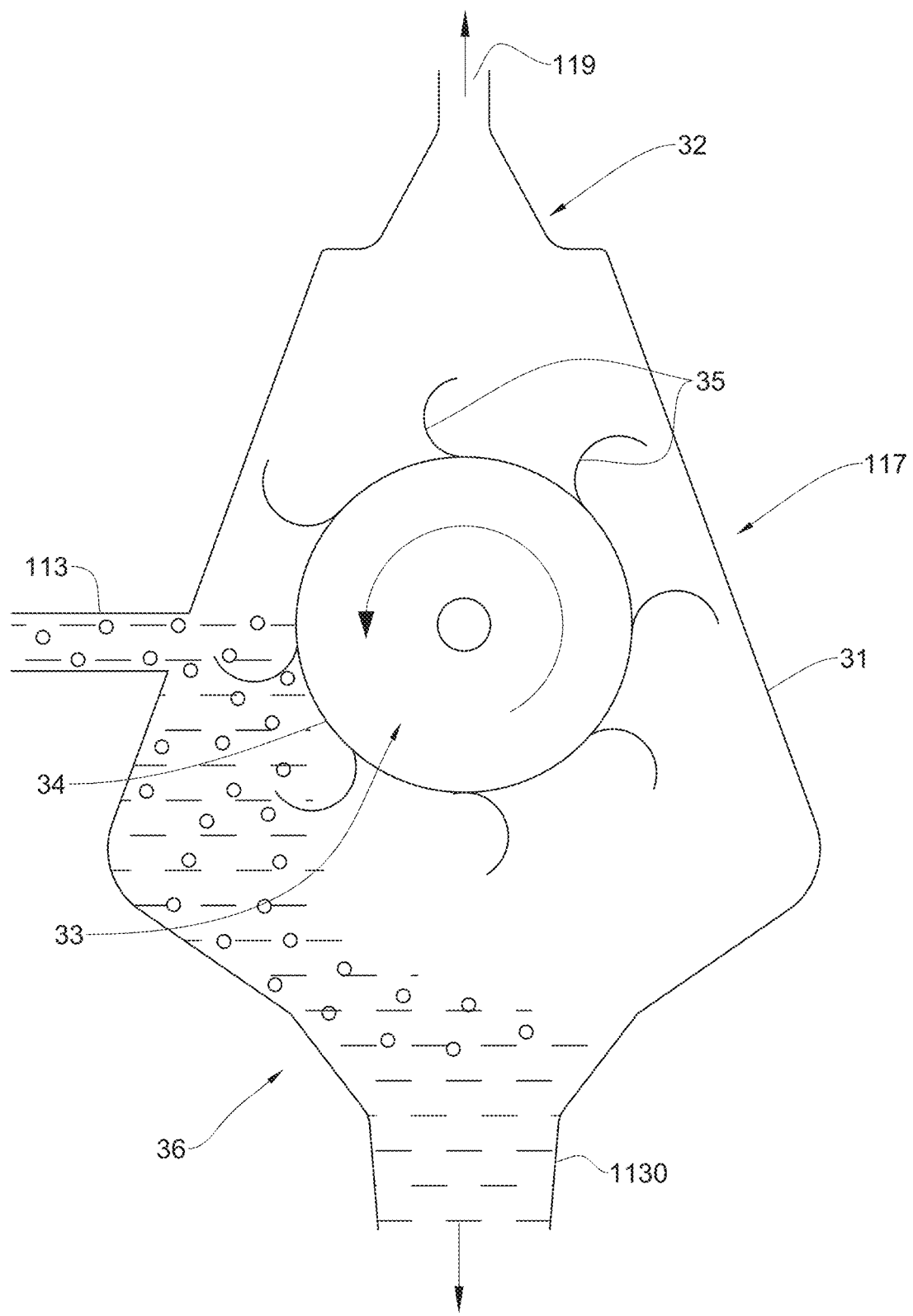
FIG. 3 is a schematic cross-sectional view of a hydro-electric power system of the energy storage and electrical power generation system of FIG. 2, according to an embodiment of the present invention.

Referring to FIG. 3, a schematic cross-sectional view of a hydro-electric power system of the energy storage and electrical power generation system 117 is illustrated, according to an embodiment of the present invention. The hydro-electric power system 117 includes a housing 31 that includes the air release outlet 119 at a top portion 32 through which air released from the bubbles escapes into the atmosphere. The hydro-electric power system 117 includes a hydraulic turbine 33 mounted in the housing 31.

The hydraulic turbine 33 has turbine reel 34 equipped with turbine blades 35. The hydraulic turbine 33 is driven by flow of water and bubbles acting on the turbine blades 35. The water flow is generated by air-lift and is provided by the riser tube 113. The water is accumulated at a bottom portion 36 of the housing 31, and then returns to the water collecting tank (111 in FIG. 2) through the returning tube 1130 that is coupled to the bottom portion 36.

The hydro-electric power system 117 also includes an electrical generator (not shown) coupled to hydraulic turbine 33. The electrical generator is connected to an electrical power grid (15 in FIG. 2), and is configured to generate output electrical power and provide it to the electrical power grid.

According to an embodiment of the present invention, excess electrical energy in the electrical power grid 15 can again be converted into pneumatic-energy, and thus be stored in the energy storage subsystem 10 through air compression. The pneumatic-energy may then be converted back to electricity by the hydro-electric power system 117 and fed into the grid, and so on.

It should be noted that performance of the airlift pumping system 110 depends on a number of important parameters.

These parameters can be classified into two types: design parameters and operating parameters. The design parameters, inter alia, include configuration of the airlift pumping system 110, e.g., the diameter and height of the riser tube 113 and other geometrical characteristics. The operating parameters, inter alia, include the submersion ratio in the airlift pumping system 110, and the gas flow rate.

It was found by the inventor that the temperature of the compressed gas can also affect performance of the airlift pumping system 110. In particular, the greater the temperature of the compressed gas, the greater the flow rate of the upward flow of the water together with the air bubbles in the riser tube 113.

These design and operating parameters affect several phenomena occurring in the airlift system, such as the size and the shape of the bubbles, the gas flow regime, the pressure drop, the gas holdup, and the liquid flow rate.

As can be understood by a person versed in the art, temperature of the air increases during compression. Thus, the compressed air stored in the first and second air storage vessels 12a and 12b of the energy storage subsystem 10 and the water inside the compressing vessels 11a and 11b has a temperature greater than the temperature of the ambient air in the atmosphere. When the first and second air storage vessels 12a, 12b and the compressing vessels 11a and 11b are thermally isolated from the environment, the increased temperature of the compressed air and the water can be maintained for a relatively long time. The energy storage and electricity generation system 1 advantageously leverages this feature for enhancing the performance of the electricity generation subsystem 100 by storing the heat generated by the air compressing process and then later recovering this heat by the electrical power generation process.

According to some embodiments of the present invention, the system 1 for energy storage and electricity generation includes a control system generally indicated by a reference numeral 18. The control system 18 is coupled, inter alia, to the air control valve 109 arranged in the air pipeline 108 to regulate the flow of the compressed gas released from the first and second air storage vessels 12a and 12b of the energy storage subsystem 10 so that a desired flow rate of egress of the compressed gas is maintained over specified periods of time through the air pipeline 108.

The control system 18 is a computer system that, generally, may include, without limitations, flow meters, sensors, actuators, monitoring devices, as well as other similar or suitable devices. Each may be a commercially available component. The control system 18 also includes an electronic controller (not shown) programmed with a software model stored in a computer-readable medium (not shown), and configured for controlling operation of the energy storage and electricity generation system 1.

For measuring pressure of the air within the first and second air storage vessels 12a and 12b and within the volume of the first and second air compressing vessels 11a and 11b that is unoccupied by water, the control system can include one or more pneumatic pressure sensors (not shown) that can be operable for producing air pressure sensor signals throughout operation of the system. Likewise, the control system can include one or more hydraulic pressure sensors (not shown) that can be operable for producing hydraulic pressure sensor signals throughout operation of the system. Location of the pneumatic and hydraulic pressure sensors depends on the specific configuration of the system. For example, the pneumatic pressure sensors can be arranged in the first and second air storage vessels 12a and 12b. In turn, the hydraulic pressure sensors can be arranged within the first and second air compressing vessels 11a and 11b that are occupied by water. When required, the control system 18 can alert the operator of any detrimental pressure drops. The gas and hydraulic pressure sensor signals can be relayed to control system 18 via a connecting wire, or wirelessly.

According to some embodiments, the control system 18 includes an upper water level sensor (not shown) arranged inside the water collecting tank 111. The upper water level sensor is configured for producing level signals to ensure that the level of water inside the water collecting tank 111 is within a predetermined level limit range.

According to some embodiments, the control system 18 can include one or more pneumatic pressure sensors. For example, a pneumatic pressure sensor P can be arranged within the air pipeline 108 and measure a pressure of the air passing through the air pipeline 108. The electronic controller of the control system 18 can be operatively coupled to the pneumatic pressure sensors, the hydraulic pressure sensor, and the water level sensors, for controllable compression of air. The electronic controller can, inter alia, be responsive to the air pressure sensor signals, the hydraulic pressure sensor signals, the level signals and the air and water flow sensor signals, respectively, for controlling operation of the energy storage subsystem 10.

In order to provide regulation of the flow rate, the control system 18 can include one or more hydraulic and pneumatic flow meters (not shown). For example, a pneumatic flow meter AF can be arranged within the air pipeline 108 to produce air flow sensor signals representative of the air flows within the air pipeline 108. The electronic controller of the control system 18 is coupled to the air control valve 109. The pneumatic flow meter AF is operatively coupled to the electronic controller. The pneumatic flow meter AF is configured to produce air flow sensor signals representative of the air flow within the air pipeline 108. The electronic controller can be responsive to air flow sensor signals and configured generate control signals to control, inter alia, operation of the pneumatic control valve 109 in order to regulate flow of the compressed gas released from the first and second air storage vessels 12a and 12b of the energy storage subsystem 10 so as to provide controllable discharge of the compressed air required to drive the airlift pumping system 110.

According to an embodiment of the present invention, a hydraulic flow meter (not shown) can be arranged within the riser tube 113 of the airlift pumping system 110 to produce water flow sensor signals representative of the water flow within the riser tube 113. The hydraulic flow meter is coupled to the electronic controller of the control system which is, inter alia, responsive to the water flow sensor signal and for controlling operation of the hydro-electric power system 117.

Depending on the power attributes of the electricity generation subsystem 10 (input availability and output demand), a desired air flow rate can be specified and maintained by the electronic controller during operation of the system. The air control valve 109 ensures a stable supply of pressurized air to produce constant electrical power output over stipulated periods, hence overcoming certain technical problems encountered with conventional technology when feeding electricity to the grid.

According to some embodiments, the electronic controller of the control system 18 can also be operatively coupled to the first and second air storage valves 1041a, 1041b and to the first and second compressed air valves 1042a, 1042b for control of passage of the compressed air from the first and second air compressing vessels 11a, 11b to the first and second air storage vessels 12a, 12b, correspondingly. Likewise, the control system 18 can also be operatively coupled to the first and second inlet air valves 1043a, 1043b for controlling supply of air for compression in the first and second air compressing vessels 11a, 11b, correspondingly.

According to some embodiments, the electronic controller of the control system 18 can also be operatively coupled to the first and second upper inlet water valve 191a, 19M, to the first and second lower inlet water valve 195a, 195b as well as to the first and second water exchange valves 105a, 105b; and to the reverse water pump 103 for regulating water exchange between the first and second air compressing vessels 11a and 11b of the first and second energy storage branches 101a and 101b, as described above.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A system for energy storage for storing energy in the form of compressed air, comprising:
a first energy storage branch and a second energy storage branch, the first energy storage branch including:

a first air compressing vessel configured to collect water and air from the atmosphere and to compress the air to a predetermined pressure;

a first air storage vessel pneumatically communicating with the first air compressing vessel and configured to hold compressed air;

a first compressed air manifold pneumatically coupled to the first air compressing vessel and to the first the air storage vessel, and configured to provide pneumatic communication between the first air compressing vessel and the first air storage vessel;

a first air inlet manifold pneumatically coupled to the compressed air manifold, and configured to provide air from the atmosphere, so as to compress the air in the first air compressing vessels and to fill the first air storage vessel with the compressed air;

a first air valve assembly including:
- a first air storage valve arranged in the first compressed air manifold between the first air storage vessel and a first coupling point of the first air inlet manifold to the first compressed air manifold and configured for control of passage of the compressed air from the first air compressing vessel into the first air storage vessel;
- a first compressed air valve arranged in the first compressed air manifold between the first air compressing vessel and the first coupling point, and is configured for control of passage of the compressed air from the first air compressing vessel into the first air storage vessel; and
- a first inlet air valve configured for controlling supply of air for compression in the first air compressing vessel and for storage of the compressed air in the first air storage vessel;

a first water inlet manifold hydraulically coupled to the first air compressing vessel, and configured to supply water to the first air compressing vessel;

a first upper inlet water valve and a first lower inlet water valve arranged in the first water inlet manifold and configured for controlling supply of water into the first air compressing vessel;

the second energy storage branch including:

a second air compressing vessel configured to collect water and air from the atmosphere and to compress the air to a predetermined pressure;

a second air storage vessel pneumatically communicating with the second air compressing vessel and configured to hold compressed air;

a second compressed air manifold pneumatically coupled to the second air compressing vessel and to the second air storage vessel, and configured to provide pneumatic communication between the second air compressing vessel and the second air storage vessel;

a second air inlet manifold pneumatically coupled to the second compressed air manifold, and configured to provide air from the atmosphere, so as to compress the air in the second air compressing vessels and to fill the second air storage vessel with the compressed air, a second air valve assembly including:
- a second air storage valve arranged in the second compressed air manifold between the second air storage vessel and a second coupling point of the second air inlet manifold to the second compressed air manifold and configured for control of passage of the compressed air from the second air compressing vessel into the second air storage vessel;
- a second compressed air valve arranged in the second compressed air manifold between the second air compressing vessel and the second coupling point, and configured for control of passage of the compressed air from the second air compressing vessel into the second air storage vessel; and
- a second inlet air valve configured for controlling supply of air for compression in the second air compressing vessel and for storage of the compressed air in the second air storage vessel;

a second water inlet manifold hydraulically coupled to the second air compressing vessel, and configured to supply water to the second air compressing vessel;

a second upper inlet water valve and a second lower inlet water valve arranged in the second water inlet manifold and configured for controlling supply of water into the second air compressing vessel.

2. The system of claim 1, wherein the first and second air compressing vessels, and the first and second air storage vessels, are arranged in corresponding boreholes made in the ground.

3. The system of claim 2, wherein the first and second air storage vessels, and the first and second compressing vessels in the boreholes are surrounded by a compacted and thermally isolated filling material filling a space between walls of these vessels and walls of the borehole.

4. The system of claim 1, further comprising:
a water exchange manifold hydraulically coupled to the first water inlet manifold of the first energy storage branch between the first upper and lower inlet water valves at one end of the first water inlet manifold and to the second water inlet manifold of the second energy storage branch between the second upper and lower inlet water valves at another end of the first water inlet manifold; and
a reverse water pump arranged in the water exchange manifold.

5. The system of claim 4, wherein the reverse water pump is an electric pump that is coupled to an electrical power grid and powered by electricity, the reverse water pump is configured to pump water for exchange between the first and second air compressing vessels of the first and second energy storage branches, correspondingly.

6. The system of claim 4, wherein the first energy storage branch further includes:
a first sprinkler manifold coupled to the first water inlet manifold at one end of first sprinkler manifold, and inserted into the first air compressing vessel at another end of first sprinkler manifold, the first sprinkler manifold is configured to enable hydraulic communication of the first air compressing vessel with the water exchange manifold;
a first sprinkler nozzle at the end that is inserted into the first compressing vessel, and
a first sprinkler valve configured for controlling supply of water into the first air compressing vessel through the first sprinkler nozzle.

7. The system of claim 4, wherein the second energy storage branch includes:
a second sprinkler manifold coupled to the second water inlet manifold at one end of second sprinkler manifold, and inserted into the second air compressing vessel at another end of second sprinkler manifold, the second sprinkler manifold is configured to enable hydraulic communication of the second air compressing vessel with the water exchange manifold;

a second sprinkler nozzle at the end that is inserted into the second compressing vessel, and a second sprinkler valve configured for controlling supply of water into the second air compressing vessel through the second sprinkler nozzle.

8. The system of claim 4, further comprising:

a first water exchange valve arranged in the water exchange manifold between said first coupling point of the first air inlet manifold to the first compressed air manifold and the reverse water pump; and a second water exchange valve arranged in the water exchange manifold between said second coupling point and the reverse water pump;

the first water exchange valve and the second water exchange valve are adapted to control exchange of water between the first and second air compressing vessels.

9. The system of claim 8, wherein the first air storage vessel and the second air storage vessel are pneumatically coupled by a compressed air exchange manifold.

10. The system of claim 9, further comprising a first air exchange valve and a second air exchange valve, the first and second exchange valves are adapted to control the exchange of compressed air between the first and second air storage vessels.

11. The system of claim 10, further comprising an air pipeline, and an air control valve coupled to the compressed air exchange manifold and to the air pipeline, the air control valve configured to regulate the flow of the compressed gas released from the first and second air storage vessels of the energy storage subsystem such that a desired flow rate of egress of the compressed gas is maintained over specified periods of time through the air pipeline.

12. The system of claim 11, further comprising a control system coupled to the air control valve arranged in the air pipeline to regulate the flow of the compressed gas through the air pipeline.

13. The system of claim 12, wherein the control system includes an electronic controller coupled to the air control valve, and a pneumatic flow meter arranged within the air pipeline and operatively coupled to the electronic controller;

the pneumatic flow meter is configured to produce air flow sensor signals representative of the air flow within the air pipeline;

the electronic controller is responsive to air flow sensor signals and configured to control operation of the air control valve to regulate the flow of the compressed gas released from the first and second air storage vessels of the energy storage subsystem.

* * * * *